United States Patent
Kagi et al.

(10) Patent No.: US 11,085,505 B2
(45) Date of Patent: Aug. 10, 2021

(54) TOOTHED BELT

(71) Applicant: BANDO CHEMICAL INDUSTRIES, LTD., Kobe (JP)

(72) Inventors: Yosuke Kagi, Kobe (JP); Masaki Kimura, Kobe (JP); Masaki Ochiai, Kobe (JP); Takayuki Kusano, Kobe (JP)

(73) Assignee: BANDO CHEMICAL INDUSTRIES, LTD., Kobe (JP)

( * ) Notice: Subject to any disclaimer, the term of this patent is extended or adjusted under 35 U.S.C. 154(b) by 0 days.

(21) Appl. No.: 16/945,847

(22) Filed: Aug. 1, 2020

(65) Prior Publication Data

US 2020/0362940 A1 Nov. 19, 2020

Related U.S. Application Data

(63) Continuation of application No. PCT/JP2019/029817, filed on Jul. 30, 2019.

(30) Foreign Application Priority Data

Oct. 17, 2018 (JP) .............................. JP2018-195627

(51) Int. Cl.
   *F16G 1/10* (2006.01)
   *F16G 1/28* (2006.01)
   (Continued)

(52) U.S. Cl.
   CPC .............. *F16G 1/10* (2013.01); *C08L 15/005* (2013.01); *D06M 13/395* (2013.01);
   (Continued)

(58) Field of Classification Search
   CPC ..... F16G 1/10; F16G 1/28; B32B 3/08; B32B 3/085; B32B 2262/00; B32B 2262/101;
   (Continued)

(56) References Cited

U.S. PATENT DOCUMENTS 3,496,783 A * 2/1970 Garbin .................. B29D 29/10
                                                    474/260
4,498,891 A * 2/1985 Mashimo ............... B29D 29/00
                                                    474/205

(Continued)

FOREIGN PATENT DOCUMENTS

| JP | 2010-71334 A | 4/2010 |
| JP | 5185749 | 4/2013 |

(Continued)

OTHER PUBLICATIONS

International Search Report and Written Opinion dated Apr. 23, 2020 as received in Application No. PCT/JP2019/029817.

*Primary Examiner* — Michael R Mansen
*Assistant Examiner* — Mark K Buse
(74) *Attorney, Agent, or Firm* — Maschoff Brennan

(57) ABSTRACT

A cord of a toothed belt is made of a twisted yarn including a band-like material. The band-like material includes a filament bundle of high-strength glass fibers integrated together through a binder. The binder contains a rubber component, at least either a maleimide-based compound or a polyisocyanate compound, and a powdery inorganic filler. A surface of a reinforcing fabric facing opposite to the toothed belt body is coated with a surface-coating rubber layer made of a rubber composition containing a rubber component including hydrogenated nitrile-butadiene rubber as a main part.

20 Claims, 9 Drawing Sheets

(51) Int. Cl.
  *C08L 15/00* (2006.01)
  *D06M 13/395* (2006.01)
  *D06M 13/402* (2006.01)
  *D06M 101/00* (2006.01)

(52) U.S. Cl.
  CPC ............ *D06M 13/402* (2013.01); *F16G 1/28* (2013.01); *C08L 2205/16* (2013.01); *D06M 2101/00* (2013.01)

(58) Field of Classification Search
  CPC . B32B 2262/12; B32B 2433/04; B32B 25/10; B32B 3/28
  USPC ........................................................ 474/205
  See application file for complete search history.

(56) References Cited

U.S. PATENT DOCUMENTS

| | | | | |
|---|---|---|---|---|
| 5,230,667 A | * | 7/1993 | Nakajima | F16G 1/28 474/263 |
| 5,735,763 A | * | 4/1998 | Kawahara | F16G 1/08 474/263 |
| 6,872,159 B2 | * | 3/2005 | Knutson | F16G 5/06 474/260 |
| 9,765,851 B2 | * | 9/2017 | Kobayashi | F16G 1/08 |
| 2006/0063627 A1 | | 3/2006 | Tomobuchi | |
| 2008/0032130 A1 | * | 2/2008 | Akiyama | C08J 5/06 428/375 |
| 2011/0129647 A1 | * | 6/2011 | Duke, Jr. | C08J 5/046 428/156 |
| 2014/0206487 A1 | * | 7/2014 | Tomobuchi | C08K 5/3415 474/205 |
| 2015/0024892 A1 | * | 1/2015 | Hineno | B29C 35/02 474/237 |
| 2015/0111677 A1 | * | 4/2015 | Nishiyama | C08K 5/20 474/264 |
| 2018/0313028 A1 | * | 11/2018 | Tomoda | F16G 1/10 |
| 2019/0011016 A1 | | 1/2019 | Yoshida et al. | |
| 2020/0378469 A1 | * | 12/2020 | Tamura | F16G 1/10 |

FOREIGN PATENT DOCUMENTS

| | | |
|---|---|---|
| WO | 2006/001385 A1 | 1/2006 |
| WO | 2017/168912 A1 | 10/2017 |

* cited by examiner

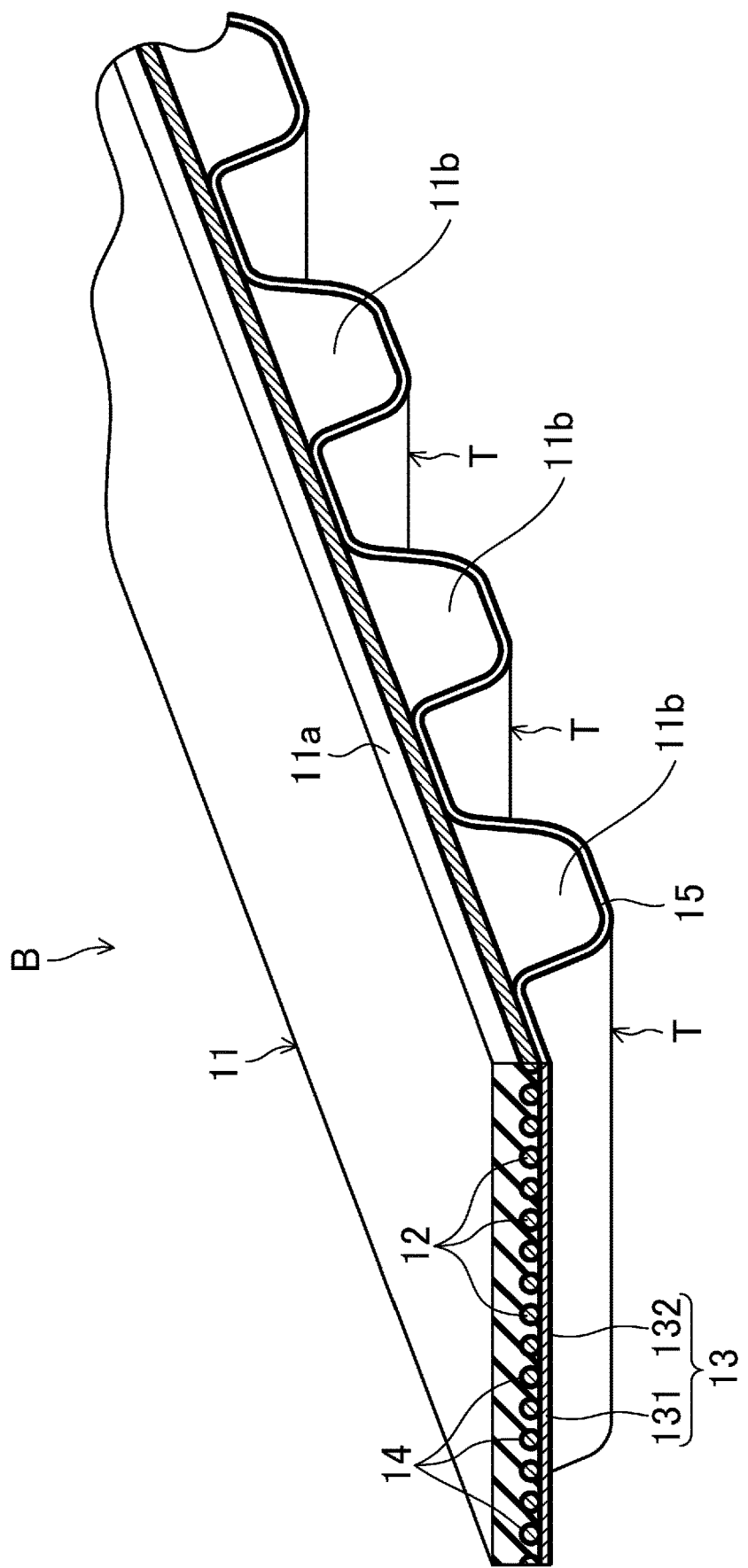

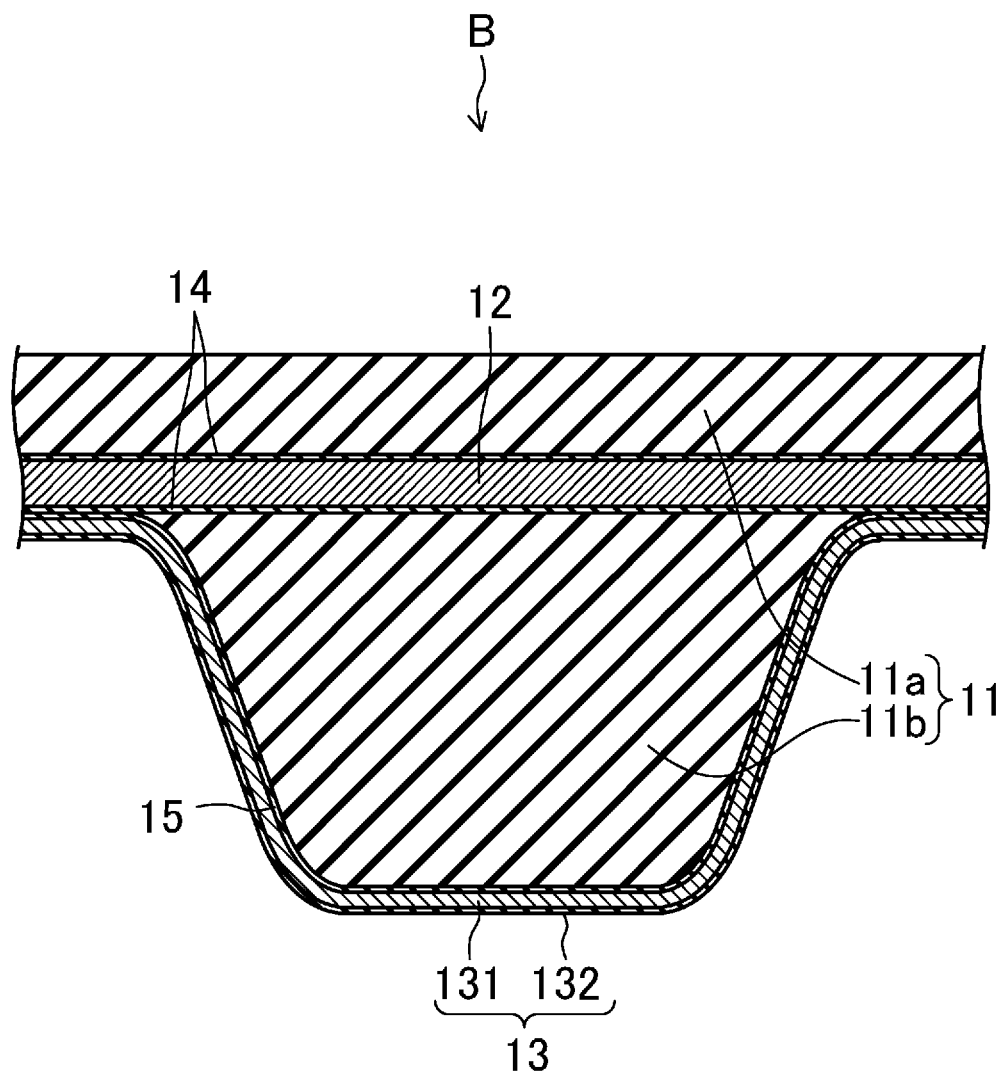

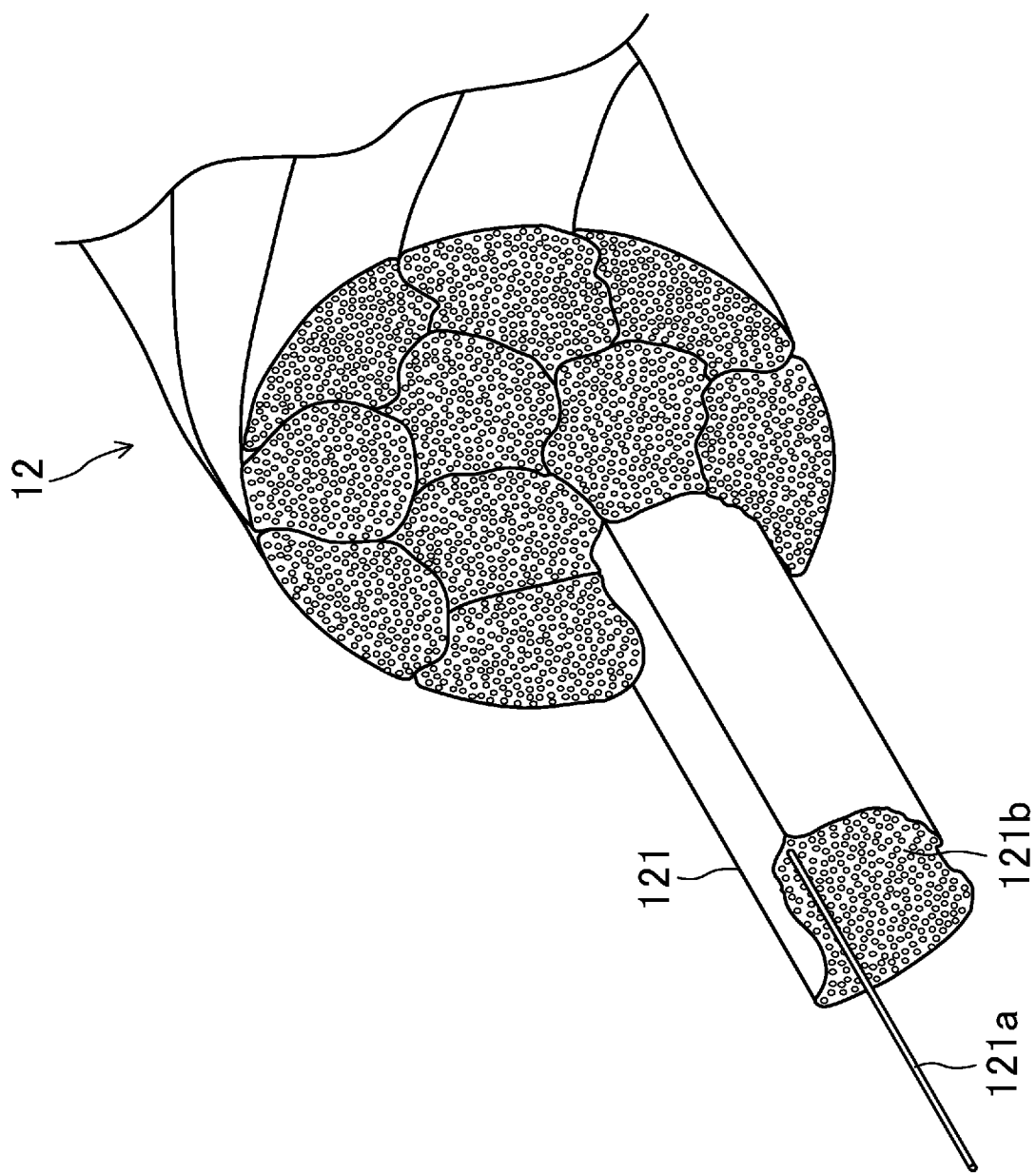

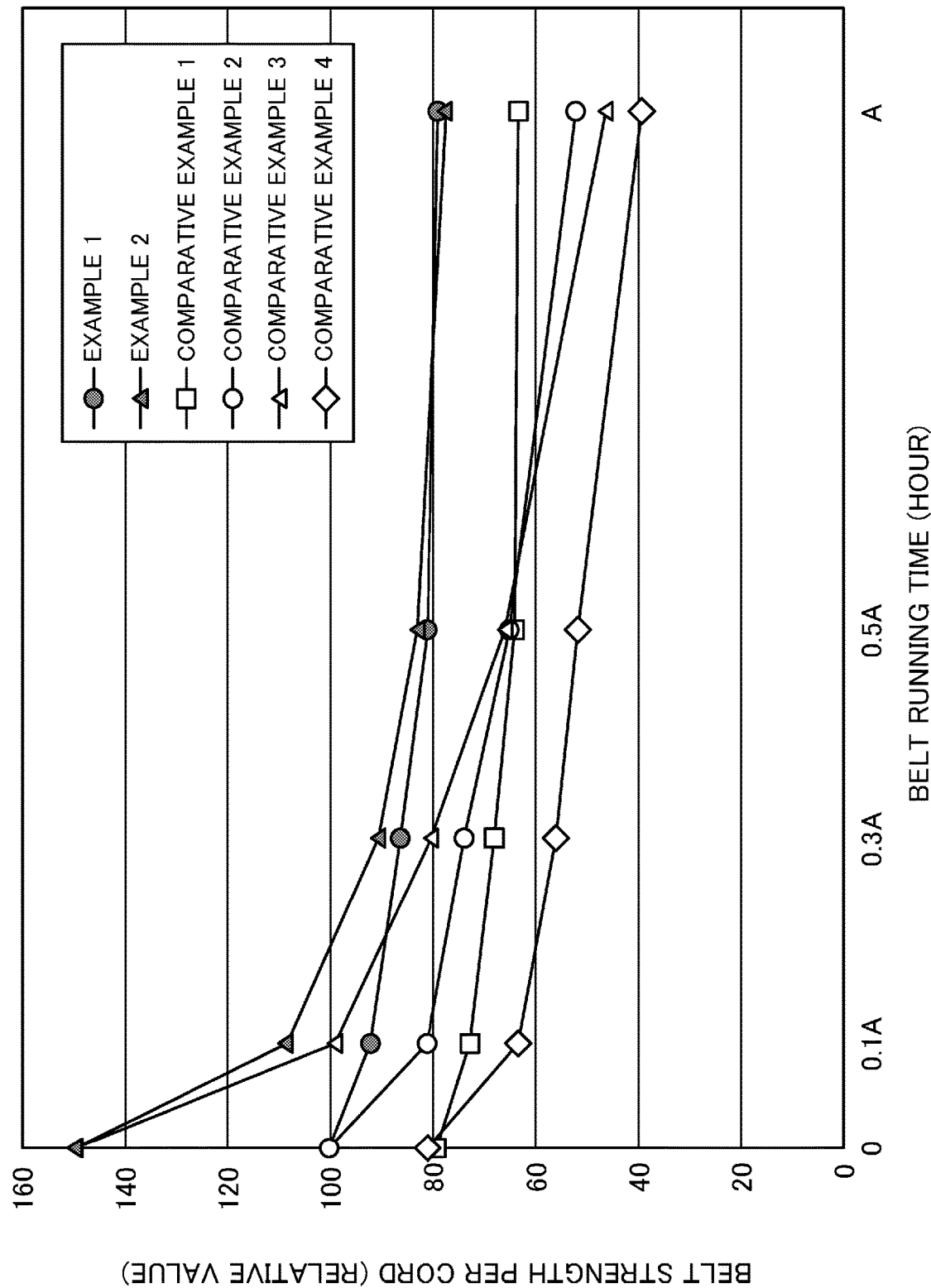

TOOTHED BELT

CROSS-REFERENCE TO RELATED APPLICATIONS

This is a continuation of International Application No. PCT/JP2019/029817 filed on Jul. 30, 2019, which claims priority to Japanese Patent Application No. 2018-195627 filed on Oct. 17, 2018. The entire disclosures of these applications are incorporated by reference herein.

BACKGROUND

The present invention relates to a toothed belt.

A toothed belt for driving an overhead camshaft (OHC) of an automobile engine is used in an environment where oil adheres to the toothed belt.

Japanese Patent No. 5185749 shows that, to maintain for a long period of time the strength of a toothed belt for use in such an environment where oil adheres to the toothed belt, the number of second twists of a cord embedded in a toothed belt body is determined using a predetermined numerical formula.

SUMMARY

The present invention is directed to a toothed belt including: a toothed belt body made of rubber and having an endless rubber strip portion and a plurality of toothed rubber portions integrated with one surface of the rubber strip portion so as to be spaced apart from each other in a belt length direction; a cord embedded in the rubber strip portion of the toothed belt body so as to extend while forming a helical pattern having a pitch in a belt width direction; and a reinforcing fabric covering a surface of the toothed belt body where the toothed rubber portions are formed, wherein the cord is made of a twisted yarn including a band-like material, the band-like material including a filament bundle of high-strength glass fibers integrated together through a binder, the binder containing a rubber component, at least either a maleimide-based compound or a polyisocyanate compound, and a powdery inorganic filler, a surface of the reinforcing fabric facing opposite to the toothed belt body is coated with a surface-coating rubber layer made of a rubber composition containing a rubber component including hydrogenated nitrile-butadiene rubber as a main part.

BRIEF DESCRIPTION OF THE DRAWINGS

FIG. 1A is a perspective view illustrating a piece of a toothed belt according to an embodiment.

FIG. 1B is a longitudinal sectional view illustrating a single belt tooth of the toothed belt according to the embodiment.

FIG. 2A is a perspective view illustrating a cord.

FIG. 6 is a graph showing a relationship between belt running time and belt strength per cord.

DETAILED DESCRIPTION

Figure 2B:
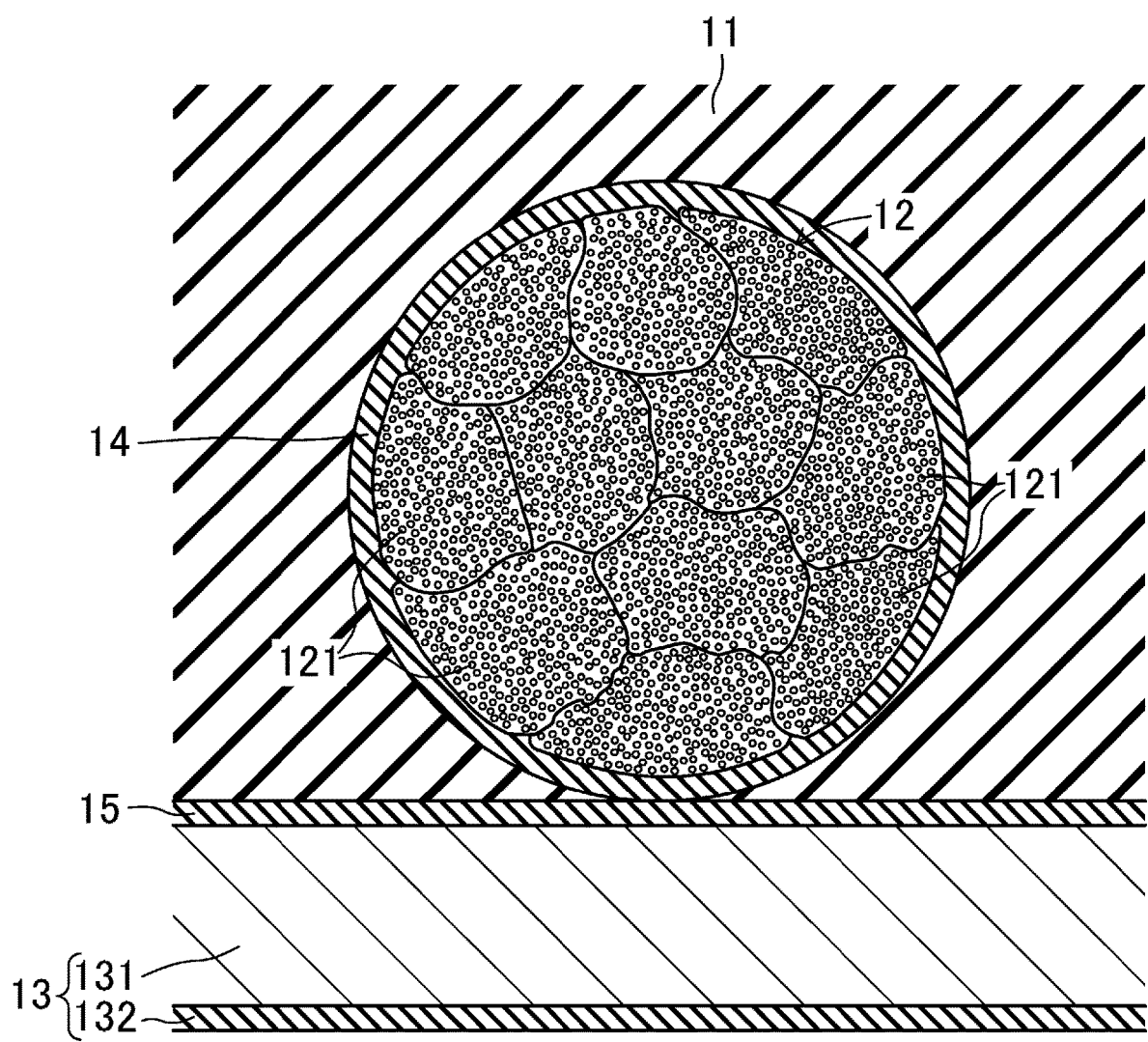
FIG. 2B is a cross-sectional view illustrating the cord embedded in a toothed belt body in an enlarged scale.

Embodiments will be described in detail below.

FIGS. 1A and 1B illustrate a toothed belt B according to an embodiment. The toothed belt B according to the embodiment is an endless power transmission member for use in an environment where oil adheres to the power transmission member, such as an environment where an overhead camshaft (OHC) of an automobile engine is rotationally driven or an environment where a spindle of a machine tool is driven. The toothed belt B of the embodiment has a length ranging from 100 mm to 2300 mm, a width ranging from 4 mm to 40 mm, and a maximum thickness ranging from 2.0 mm to 7.0 mm, for example.

The toothed belt B according to the embodiment is an engaging transmission belt provided with a plurality of belt teeth T arranged at predetermined pitches and constituting an inner side portion of the belt. The belt teeth T may be trapezoidal teeth, which are each a ridge extending in a belt width direction and having a trapezoidal cross section as viewed from the side. Alternatively, the belt teeth T may be round teeth having a semicircular cross section as viewed from the side, or may be teeth having a cross section with another shape as viewed from the side. The belt teeth T may be helical teeth extending in a direction angled with respect to the belt width direction.

The height of each belt tooth T is defined by a dimension from a tooth bottom portion, disposed between a pair of belt teeth T arranged next to each other in the belt length direction, to the top of the belt tooth T. The height of the belt tooth T ranges from 0.37 mm to 4.0 mm, for example. The width of each belt tooth T is defined by a dimension between closest ends of a pair of tooth bottom portions having a belt tooth T interposed therebetween in the belt length direction. The width of the belt tooth T ranges from 0.63 mm to 8.0 mm, for example. The pitch of the belt teeth T ranges from 1.0 mm to 10.0 mm, for example.

The toothed belt B according to the embodiment includes a toothed belt body 11, a cord 12, and a reinforcing fabric 13.

The toothed belt body 11 is made of rubber and has an endless rubber strip portion 11a and a plurality of toothed rubber portions 11b. The toothed rubber portions 11b are integrated with one surface of the rubber strip portion 11a so as to be spaced apart from each other in the belt length direction, and constitute an inner side portion of the belt on one side of the rubber strip portion 11a. The toothed belt body 11 is made of a rubber composition produced by heating and pressing an uncrosslinked rubber composition prepared by mixing a rubber component and various compound ingredients during belt formation, and thereby crosslinking the rubber component.

Examples of the rubber component of the rubber composition that makes the toothed belt body 11 include hydrogenated nitrile-butadiene rubber (hereinafter referred to as "H-NBR"), ethylene-α-olefin elastomer (such as EPDM and EPR), chloroprene rubber (CR), and chlorosulfonated polyethylene rubber (CSM). The rubber component suitably contains one kind or two or more kinds of these substances, and more suitably contains H-NBR to reduce a decrease in the strength of the belt used in the environment where oil adheres to the belt.

If the rubber component of the rubber composition that makes the toothed belt body 11 contains H-NBR as a main part, the bound acrylonitrile content in the H-NBR ranges suitably from 20% by mass to 50% by mass to reduce a decrease in the strength of the belt used in the environment where oil adheres to the belt. For the same or similar reason, the iodine value of the H-NBR ranges suitably from 5 mg/100 mg to 15 mg/100 mg. For the same or similar reason, the Mooney viscosity of the H-NBR at 100° C. ranges suitably from 40 $ML_{1+4}$ (100° C.) to 70 $ML_{1+4}$ (100° C.).

Examples of the compound ingredients include a reinforcing material (such as carbon black and silica), a plasticizer, a processing aid, a crosslinking agent, a co-crosslinking agent, a vulcanization accelerator, and a vulcanization accelerator aid.

The cord 12 is embedded in an innermost peripheral layer of the rubber strip portion 11a of the toothed belt body 11 and extends while forming a helical pattern having a pitch in the belt width direction. The cord 12 has a diameter ranging from 0.2 mm to 1.5 mm, for example. The distance between portions of the cord 12 adjacent to each other in the belt width direction ranges from 0.3 mm to 3.0 mm, for example.

Figure 2C:
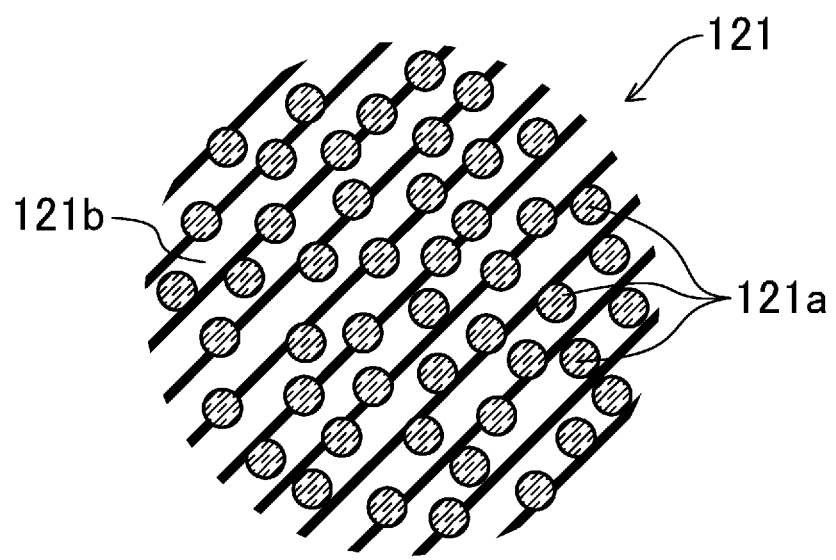
FIG. 2C is a cross-sectional view illustrating a strand in an enlarged scale.

As shown in FIGS. 2A to 2C, the cord 12 is made of a twisted yarn including band-like materials each configured as a filament bundle of high-strength glass fibers 121a integrated together through a binder 121b. The cord 12 has the high-strength glass fibers 121a embedded in the binder 121b such that islands of the high-strength glass fibers 121a are dispersed in the sea of the binder 121b as viewed in cross section.

The "high-strength glass fibers 121a" as used herein refer to fibers of glass having a higher $SiO_2$ content fraction than E-glass. Specific examples of the high-strength glass fibers 121a include fibers of C-glass, S-glass, and D-glass each having a $SiO_2$ content fraction ranging from 58% by mass to 75% by mass. To reduce a decrease in the strength of the belt used in the environment where oil adheres to the belt, the filament diameter of the high-strength glass fibers 121a ranges suitably from 5 μm to 11 μm and more suitably from 7 μm to 9 μm.

The binder 121b contains a rubber component, at least either a maleimide-based compound or a polyisocyanate compound, and a powdery inorganic filler.

The rubber component of the binder 121b may be either uncrosslinked rubber or crosslinked rubber. Examples of the rubber component of the binder 121b include vinylpyridine-styrene-butadiene rubber (Vp-SBR), styrene-butadiene rubber (SBR), natural rubber (NR), chloroprene rubber (CR), chlorosulfonated polyethylene rubber (CSM), 2,3-dichlorobutadiene rubber (2,3-DCB), and H-NBR. The rubber component of the binder 121b suitably contains one kind or two or more kinds of these substances, and more suitably contains H-NBR. The rubber component of the binder 121b suitably results from latex.

Examples of the maleimide-based compound include maleimide, bismaleimide, 4,4'-phenylmethane bismaleimide, N-methylmaleimide, N-isopropylmaleimide, N-butylmaleimide, N-dodecylmaleimide, N-cyclohexylmaleimide, N-phenylmaleimide, N-(2-methylphenyl)maleimide, N-(4-methylphenyl)maleimide, N-(2,6-dimethylphenyl)maleimide, N-(2,6-diethylphenyl)maleimide, N-benzylmaleimide, N-naphthylmaleimide, and N,N'-m-phenylenedimaleimide.

Examples of the polyisocyanate compound include 2,4-tolylene diisocyanate, 2,6-tolylene diisocyanate, xylylene diisocyanate, 4,4'-diphenyl methane diisocyanate, methylene diisocyanate, isopropylene diisocyanate, lysine diisocyanate, 2,2,4-trimethyl hexamethylene diisocyanate, 2,4,4-trimethyl hexamethylene diisocyanate, 1,6-hexamethylene diisocyanate, methylcyclohexane diisocyanate, isophorone diisocyanate, 4,4'-dicyclohexylmethane diisocyanate, and isopropylidene dicyclohexyl-4,4'-diisocyanate.

The maleimide-based compound and/or polyisocyanate compound of the binder 121b suitably contains one kind or two or more kinds of these substances. The binder 121b more suitably contains both the maleimide-based compound and the polyisocyanate compound to reduce a decrease in the strength of the belt used in the environment where oil adheres to the belt. For the same or similar reason, the content of the maleimide-based compound and/or the polyisocyanate compound in the binder 121b with respect to 100 parts by mass of the rubber component ranges suitably from 1 part by mass to 40 parts by mass, and more suitably from 10 parts by mass to 30 parts by mass.

Examples of the powdery inorganic filler include powder of carbon black, silica, diatomaceous earth, alumina, zinc oxide, titanium oxide, calcium oxide, magnesium oxide, iron oxide, tin oxide, antimony oxide, calcium hydroxide, magnesium hydroxide, aluminum hydroxide, magnesium carbonate, calcium carbonate, magnesium carbonate, zinc carbonate, barium carbonate, hydrotalcite, calcium sulfate, barium sulfate, calcium silicate, talc, clay, mica, montmorillonite, bentonite, activated clay, sepiolite, imogolite, sericite, aluminum nitride, boron nitride, silicon nitride, potassium titanate, magnesium sulfate, lead zirconate titanate, aluminum borate, molybdenum sulfide, silicon carbide, and zinc borate.

The powdery inorganic filler of the binder 121b suitably contains one kind or two or more kinds of these substances, and more suitably contains at least either carbon black or silica to reduce a decrease in the strength of the belt used in the environment where oil adheres to the belt. For the same or similar reason, the content of the powdery inorganic filler in the binder 121b with respect to 100 parts by mass of the rubber component ranges suitably from 0.5 parts by mass to 20 parts by mass, and more suitably from 0.5 parts by mass to 10 parts by mass. The average particle size of the powdery inorganic filler ranges from 5 nm to 300 nm, for example.

The binder 121b may contain a surfactant and any other substances as necessary in addition to the rubber component, the maleimide-based compound, the polyisocyanate compound, and the powdery inorganic filler. Suitably, however, the binder 121b does not substantially contain a condensate of resorcin and formalin, i.e., a phenolic resin, such as an RF resin, to reduce a decrease in the strength of the belt used in the environment where oil adheres to the belt. The phrase "does not substantially contain" as used herein means that the content of the substance in the binder 121b with respect to 100 parts by mass of the rubber component is less than 0.5 parts by mass.

The amount of the binder 121b adhering to the cord 12 with respect to the mass of the high-strength glass fibers 121a ranges suitably from 5% by mass to 40% by mass and more suitably from 10% by mass to 30% by mass, to reduce a decrease in the strength of the belt used in the environment where oil adheres to the belt.

To reduce a decrease in the strength of the belt used in the environment where oil adheres to the belt, the twisted yarn constituting the cord 12 is suitably a plied yarn. The plied yarn is made of a plurality of strands 121, each configured as the band-like material that is made of the filament bundle of high-strength glass fibers 121a integrated together through the binder 121b and is first-twisted in one direction. These strands 121 are collected and paralleled, and are second-twisted in a direction opposite to the one direction in which each strand 121 is first-twisted. The plied yarn constituting the cord 12 may be made of either an S-twist yarn or a Z-twist yarn. Alternatively, the plied yarn may be an S-twist yarn and a Z-twist yarn arranged in a double helix form. The twisted yarn constituting the cord 12 may be a single twist yarn obtained by twisting a band-like material in one direction, or a lang's lay including a plurality of strands 121 which are each formed as a band-like material twisted in one direction and which are collected, paralleled, and twisted in the same direction in which the strands 121 are twisted.

In the case of the cord 12 made of a plied yarn, the number of filaments of the high-strength glass fibers 121a included in each strand 121 ranges suitably from 600 to 3600 and more suitably from 1200 to 2400, to reduce a decrease in the strength of the belt used in the environment where oil adheres to the belt. The number of the strands 121 ranges from 2 to 50, for example, depending on the belt size. The strands 121 may be arranged to have rotational symmetry and/or mirror symmetry as viewed in cross section of the cord 12. Suitably, however, if the number of the strands 121 is eight or more, the strands 121 are arranged at random.

The number of first twists of each strand 121 per 10 cm ranges suitably from 2 to 16, and more suitably from 4 to 8, to reduce a decrease in the strength of the belt used in the environment where oil adheres to the belt. For the same or similar reason, the number of second twists of the cord 12 per 10 cm ranges suitably from 16 to 40, and more suitably from 24 to 32. For the same or similar reason, the number of first twists of the strand 121 per 10 cm is less than the number of second twists of the cord 12 per 10 cm.

To produce the cord 12 made of the plied yarn, filament bundles of high-strength glass fibers 121a are continuously passed through a binder treatment solution stored in a cistern. At this moment, the filament bundles of the high-strength glass fibers 121a are immersed in the binder treatment solution so as to be impregnated with the binder treatment solution. As a result, the surfaces of the high-strength glass fibers 121a are wetted with the binder treatment solution.

Each filament bundle of the high-strength glass fibers 121a is usually formed by winding multiple yarns of the high-strength glass fibers 121a drawn from a plurality of cakes. Typically, three yarns each including 200 high-strength glass fibers 121a are wound together to form a filament bundle including 600 high-strength glass fibers 121a.

To reduce a decrease in the strength of the belt used in the environment where oil adheres to the belt, the binder treatment solution is suitably a water-based treatment agent containing, as a base, latex that is the rubber component of the binder 121b, and further containing at least either the maleimide-based compound or the polyisocyanate compound and the powdery inorganic filler both dispersed in the latex. The polyisocyanate compound may have an isocyanate group blocked with caprolactam or oxime to form a blocked polyisocyanate. The solid content concentration of the binder treatment solution ranges from 3% by mass to 50% by mass, for example.

Next, the filament bundle of the high-strength glass fibers 121a is passed through a heating furnace after being taken out of the binder treatment solution. At this moment, a liquid component of the binder treatment solution included in the filament bundle of the high-strength glass fibers 121a evaporates, and a solid component thereof hardens to form a binder 121b. The high-strength glass fibers 121a are integrated together through the binder 121b to form the filament bundle as a band-like material. The heating temperature (i.e., a preset internal furnace temperature) in the heating furnace ranges from 80° C. to 300° C., for example. The period of heating (i.e., dwell time in the furnace) ranges from 10 seconds to 180 seconds, for example.

Subsequently, the band-like material that is the filament bundle of the high-strength glass fibers 121a integrated together is first-twisted in one direction to form a strand 121, which is wound around bobbins. Then, the strand 121 is pulled out from each bobbin. These strands 121 are paralleled and second-twisted to form a cord 12, which is wound around a bobbin.

The interface between the toothed belt body 11 and the cord 12 may be provided with a cord adhesion coat 14 to increase the adhesion therebetween. The cord adhesion coat 14 can be formed by immersing the cord 12 in rubber cement made of chloric rubber or any other type of rubber, drying the resultant cord 12, and thereby coating the cord surface with a cement rubber layer.

The reinforcing fabric 13 covers a surface of the toothed belt body 11 where the toothed rubber portions 11b are formed. Thus, the toothed rubber portions 11b of the toothed belt body 11 are covered with the reinforcing fabric 13 to form belt teeth T. Further, between adjacent toothed rubber portions 11b, the rubber strip portion 11a and the cord 12 embedded in the rubber strip portion 11a are covered with the reinforcing fabric 13. The reinforcing fabric 13 has a thickness ranging from 0.1 mm to 0.7 mm, for example.

The reinforcing fabric 13 is made of fabric 131, such as woven fabric, knitted fabric, and unwoven fabric. The fabric 131 has been subjected to predetermined adhesion treatment. Examples of the fiber material forming the fabric 131 to be the reinforcing fabric 13 include nylon fibers, polyester fibers, aramid fibers, and cotton. Among these fibers, nylon fibers are suitable for the fiber material forming the fabric 131 to be the reinforcing fabric 13.

Pretreatment for the fabric 131 to be the reinforcing fabric 13 includes coating treatment in which a surface of the fabric 131 facing opposite to the toothed belt body 11 is coated with rubber cement and is dried. In this coating treatment, rubber cement is used which is obtained by dissolving in an organic solvent, such as methyl ethyl ketone, an uncrosslinked rubber composition containing a rubber component including H-NBR as a main part and other compound ingredients.

The reinforcing fabric 13 is subjected to the coating treatment and thus includes a surface-coating rubber layer 132 on the surface opposite to the toothed belt body 11. The surface-coating rubber layer 132 is made of a rubber composition produced by heating and pressing, during belt formation, a rubber cement coating layer of an uncrosslinked rubber composition containing a rubber component including H-NBR as a main part and other compound ingredients, and thereby crosslinking the rubber component. The surface-coating rubber layer 132 has a thickness ranging from 0.1 μm to 100 μm, for example.

The content of the H-NBR in the rubber component of the rubber composition that makes the surface-coating rubber layer 132 is higher than 50% by mass. However, to reduce a decrease in the strength of the belt used in the environment where oil adheres to the belt, the content is suitably 70% by mass or more, and more suitably 80% by mass or more, and may be 100% by mass.

To reduce a decrease in the strength of the belt used in the environment where oil adheres to the belt, the rubber component of the rubber composition that makes the surface-coating rubber layer 132 suitably contains a rubber alloy including, as the H-NBR, unsaturated carboxylic metal salt dispersed in the H-NBR. The rubber component may contain, as the H-NBR, a blended rubber of this rubber alloy and H-NBR that is not an alloy. More suitably, the rubber component contains the rubber alloy alone. Examples of the unsaturated carboxylic acid of the unsaturated carboxylic metal salt in the rubber alloy include methacrylic acid and acrylic acid. Examples of the metal include zinc, calcium, magnesium, and aluminum.

The bound acrylonitrile content in the H-NBR (in the case of the rubber alloy, H-NBR as a base) ranges suitably from 20% by mass to 50% by mass and more suitably from 30% by mass to 40% by mass, to reduce a decrease in the strength of the belt used in the environment where oil adheres to the belt. For the same or similar reason, the iodine value of the H-NBR ranges suitably from 5 mg/100 mg to 15 mg/100 mg and more suitably from 5 mg/100 mg to 12 mg/100 mg. For the same or similar reason, the Mooney viscosity of the H-NBR at 100° C. ranges suitably from $40ML_{1+4}$ (100° C.) to $70ML_{1+4}$ (100° C.) and more suitably from $45ML_{1+4}$ (100° C.) to $65ML_{1+4}$ (100° C.).

The rubber component may contain, in addition to H-NBR, ethylene-α-olefin elastomer (such as EPDM or EPR), chloroprene rubber (CR), and chlorosulfonated polyethylene rubber (CSM), for example.

The rubber composition that makes the surface-coating rubber layer 132 suitably contains fluoric resin powder. As will be described below, the toothed belt B according to the embodiment can reduce a decrease in strength of the belt used in the environment where oil adheres to the belt. However, if the toothed belt B is used in an environment where oil does not adhere to the belt, the surface-coating rubber layer 132 directly contacts pulleys. This may cause the belt abrasion to progress. However, if the rubber composition that makes the surface-coating rubber layer 132 contains fluoric resin powder, the belt abrasion progresses can be reduced. Needless to say, similar effect of reducing abrasion can be also obtained when the belt is used in the environment where oil adheres to the belt.

Examples of the fluoric resin powder include powdery materials of a polytetrafluoroethylene resin (hereinafter, referred to as "PTFE"), a perfluoroalkoxy resin, a fluorinated ethylene propylene resin, a tetrafluoroethylene-perfluoroalkyl vinyl ether copolymer resin, a tetrafluoroethylene-ethylene copolymer resin, a trifluorochloroethylene resin, and a vinylidene fluoride resin. The fluoric resin powder suitably contains one kind or two or more kinds of these substances, and more suitably contains PTFE powder to reduce a decrease in the strength of the belt used in the environment where oil adheres to the belt. For the same or similar reason, the average particle size of the fluoric resin powder is suitably 50 μm or less, and more suitably 20 μm or less. For the same or similar reason, the content of the fluoric resin powder in the rubber composition that makes the surface-coating rubber layer 132 with respect to 100 parts by mass of the rubber component ranges suitably from 50 parts by mass to 100 parts by mass, and more suitably from 80 parts by mass to 95 parts by mass.

To reduce a decrease in the strength of the belt used in the environment where oil adheres to the belt, the rubber composition that makes the surface-coating rubber layer 132 suitably contains carbon black and silica as reinforcing materials. For the same or similar reason, the content of the carbon black in the rubber composition that makes the surface-coating rubber layer 132 with respect to 100 parts by mass of the rubber component is suitably 5 parts by mass or less. For the same or similar reason, the content of the silica in the rubber composition that makes the surface-coating rubber layer 132 with respect to 100 parts by mass of the rubber component is suitably 40 parts by mass or less, and is suitably higher than the content of the carbon black.

The rubber component of the rubber composition that makes the surface-coating rubber layer 132 may be crosslinked by using an organic peroxide as a crosslinking agent, by using sulfur as a crosslinking agent, or by using an organic peroxide and sulfur together as crosslinking agents. Examples of the organic peroxide include dicumyl peroxide, 1,3-bis(t-butyl peroxy isopropyl)benzene, and 2,5-dimethyl-2,5-di(t-butylperoxy)hexane. If the organic peroxide is used as the crosslinking agent, one kind or two or more kinds of these substances are suitably used as the crosslinking agent.

To reduce a decrease in the strength of the belt used in the environment where oil adheres to the belt, the rubber composition that makes the surface-coating rubber layer 132 suitably contains the rubber component crosslinked by using the organic peroxide as the crosslinking agent. In this case, for the same or similar reason, the content of the organic peroxide used as the crosslinking agent in the uncrosslinked rubber composition with respect to 100 parts by mass of the rubber component is preferably 10 parts by mass or less.

To reduce a decrease in the strength of the belt used in the environment where oil adheres to the belt, the rubber composition that makes the surface-coating rubber layer 132 suitably contains the rubber component crosslinked by using a co-crosslinking agent as well.

Examples of the co-crosslinking agent include N,N'-m-phenylenebismaleimide, trimethylolpropane trimethacrylate, triallyl isocyanurate, ethylene glycol dimethacrylate, and liquid polybutadiene. The co-crosslinking agent suitably contains one kind or two or more kinds of these substances. To reduce a decrease in the strength of the belt used in the environment where oil adheres to the belt, the co-crosslinking agent more suitably contains N,N'-m-phenylenebismaleimide and/or trimethylolpropane trimethacrylate, and further suitably contains both N,N'-m-phenylenebismaleimide and trimethylolpropane trimethacrylate.

To reduce a decrease in the strength of the belt used in the environment where oil adheres to the belt, the content of the co-crosslinking agent in the uncrosslinked rubber composition with respect to 100 parts by mass of the rubber component is suitably 10 parts by mass or less. Suitably, if N,N'-m-phenylenebismaleimide and trimethylolpropane trimethacrylate are both used, the content of the former is higher than the content of the latter for the same or similar reason.

Examples of the other compound ingredients include a plasticizer, a processing aid, a vulcanization accelerator, and a vulcanization accelerator aid.

The pretreatment applied to the fabric 131 forming part of the reinforcing fabric 13 may include adhesion treatment. This adhesion treatment may include coating treatment in which a surface, toward the toothed belt body 11, of the fabric 131 forming part of the reinforcing fabric 13 is coated with rubber cement and is dried. Suitably in this coating treatment, rubber cement is used which is obtained by dissolving, in an organic solvent, such as methyl ethyl ketone, an uncrosslinked rubber composition containing a rubber component including H-NBR as a main part and other compound ingredients.

In this case, this coating allows a reinforcing fabric adhesion coat 15 to be formed at the interface between the toothed belt body 11 and the reinforcing fabric 13. The reinforcing fabric adhesion coat 15 is made of a rubber composition produced by heating and pressing, during belt formation, a rubber cement coating layer of an uncrosslinked rubber composition containing a rubber component including H-NBR as a main part and other compound ingredients, and thereby crosslinking the rubber component. The reinforcing fabric adhesion coat 15 has a thickness ranging from 0.1 μm to 100 μm, for example.

The content of the H-NBR in the rubber component of the rubber composition that makes the reinforcing fabric adhesion coat 15 is higher than 50% by mass. However, to reduce a decrease in the strength of the belt used in the environment where oil adheres to the belt, the content is suitably 70% by mass or more, and more suitably 80% by mass or more, and may be 100% by mass.

To reduce a decrease in the strength of the belt used in the environment where oil adheres to the belt, the rubber component suitably contains, as H-NBR, a rubber alloy including unsaturated carboxylic metal salt dispersed in H-NBR, just like the rubber component of the surface coating rubber layer 132. The rubber component may include the rubber alloy alone as the H-NBR. More suitably, the rubber component contains a blended rubber of this rubber alloy and H-NBR that is not an alloy. Suitably in that case, to reduce a decrease in the strength of the belt used in the environment where oil adheres to the belt, the content of the rubber alloy in the rubber component is higher than that of the H-NBR that is not an alloy.

Suitably, the H-NBR in this rubber component has a bound acrylonitrile content and an iodine value that are respectively equal to those of H-NBR contained in the rubber component of the rubber composition that makes the toothed belt body 11, if the H-NBR is contained in the rubber component of the rubber composition that makes the toothed belt body 11 as the main part.

The rubber component may contain, in addition to H-NBR, ethylene-α-olefin elastomer (such as EPDM or EPR), chloroprene rubber (CR), and chlorosulfonated polyethylene rubber (CSM), for example.

To reduce a decrease in the strength of the belt used in the environment where oil adheres to the belt, the rubber composition that makes the reinforcing fabric adhesion coat 15 suitably contains carbon black and silica as reinforcing materials.

To reduce a decrease in the strength of the belt used in the environment where oil adheres to the belt, the content of the carbon black in the rubber composition that makes the reinforcing fabric adhesion coat 15 with respect to 100 parts by mass of the rubber component ranges suitably from 10 parts by mass to 40 parts by mass. Suitably, for the same or similar reason, the content of the carbon black in the rubber composition that makes the reinforcing fabric adhesion coat 15 with respect to 100 parts by mass of the rubber component is higher than that of the carbon black in the rubber composition that makes the surface coating rubber layer 132 with respect to 100 parts by mass of the rubber component.

To reduce a decrease in the strength of the belt used in the environment where oil adheres to the belt, the content of the silica in the rubber composition that makes the reinforcing fabric adhesion coat 15 with respect to 100 parts by mass of the rubber component ranges suitably from 5 parts by mass to 30 parts by mass, and is suitably lower than the content of the carbon black therein. Suitably, for the same or similar reason, the content of the silica in the rubber composition that makes the reinforcing fabric adhesion coat 15 with respect to 100 parts by mass of the rubber component is lower than that of the silica in the rubber composition that makes the surface coating rubber layer 132 with respect to 100 parts by mass of the rubber component.

The rubber component of the rubber composition that makes the reinforcing fabric adhesion coat 15 may be crosslinked by using an organic peroxide as a crosslinking agent, by using sulfur as a crosslinking agent, or by using an organic peroxide and sulfur together as crosslinking agents. Examples of the organic peroxide include α,α'-di(tri-tert-butylperoxy)diisopropylbenzene, dicumyl peroxide, 1,3-bis (t-butyl peroxy isopropyl)benzene, and 2,5-dimethyl-2,5-di (t-butylperoxy)hexane. If the organic peroxide is used as the crosslinking agent, one kind or two or more kinds of these substances are suitably used as the crosslinking agent.

If the rubber component of the rubber composition that makes the reinforcing fabric adhesion coat 15 is a blended rubber of the rubber alloy and the H-NBR, the rubber composition that makes the reinforcing fabric adhesion coat 15 suitably contains the rubber component crosslinked by using the organic peroxide and sulfur together as the crosslinking agents, to reduce a decrease in the strength of the belt used in the environment where oil adheres to the belt. In this case, for the same or similar reason, the content of the organic peroxide used as the crosslinking agent in the uncrosslinked rubber composition with respect to 100 parts by mass of the rubber component is suitably 10 parts by mass or less. For the same or similar reason, the content of the sulfur used as the crosslinking agent in the uncrosslinked rubber composition with respect to 100 parts by mass of the rubber component is suitably 5 parts by mass or less.

To reduce a decrease in the strength of the belt used in the environment where oil adheres to the belt, the rubber component of the rubber composition that makes the reinforcing fabric adhesion coat 15 is crosslinked by using a co-crosslinking agent as well.

Examples of the co-crosslinking agent include N,N'-m-phenylenebismaleimide, trimethylolpropane trimethacrylate, triallyl isocyanurate, ethylene glycol dimethacrylate, and liquid polybutadiene. The co-crosslinking agent suitably contains one kind or two or more kinds of these substances. To reduce a decrease in the strength of the belt used in the environment where oil adheres to the belt, the co-crosslinking agent more suitably contains N,N'-m-phenylenebismaleimide and/or trimethylolpropane trimethacrylate, and further suitably contains both N,N'-m-phenylenebismaleimide and trimethylolpropane trimethacrylate.

To reduce a decrease in the strength of the belt used in the environment where oil adheres to the belt, the content of the co-crosslinking agent in the uncrosslinked rubber composition with respect to 100 parts by mass of the rubber component is suitably 10 parts by mass or less. Suitably, for the same or similar reason, the content of the co-crosslinking agent in the uncrosslinked rubber composition that makes the reinforcing fabric adhesion coat 15 with respect to 100 parts by mass of the rubber component is lower than the content of the co-crosslinking agent in the uncrosslinked rubber composition that makes the surface-coating rubber layer 132 with respect to 100 parts by mass of the rubber component. Suitably, if N,N'-m-phenylenebismaleimide and trimethylolpropane trimethacrylate are both used, the content of the former is higher than the content of the latter for the same or similar reason.

Examples of the other compound ingredients include a plasticizer, a processing aid, a vulcanization accelerator, and a vulcanization accelerator aid.

The adhesion treatment applied to the fabric 131 constituting the reinforcing fabric 13 may include soaking treatment in which the fabric 131 is immersed in the rubber cement before the coating treatment and dried, may include RFL treatment in which the fabric 131 is immersed in an RFL solution before treatment using the rubber cement and heated, and may further include base treatment in which the fabric 131 is immersed in an epoxy resin solution or an isocyanate resin solution before the RFL treatment and heated.

The toothed belt B having the foregoing configuration according to the embodiment has the cord 12 embedded in the toothed belt body 11. The cord 12 is made of twisted yarns each formed as a band-like material. The band-like material includes a filament bundle of high-strength glass fibers 121a integrated together through a binder 121b containing the rubber component, at least either the maleimide-based compound or the polyisocyanate compound, and the powdery inorganic filler. A surface, opposite to the toothed belt body 11, of the reinforcing fabric 13 coating a surface of the toothed belt body 11 where the toothed rubber portions 11b are formed is coated with the surface-coating rubber layer 132 made of the rubber composition containing the rubber component including H-NBR as the main part. This can reduce a decrease in the strength of the belt used in the environment where oil adheres to the belt.

The toothed belt B according to the embodiment is used while being wrapped around a plurality of toothed pulleys. For example, in an OHC drive application of an automobile engine, the toothed belt B is wrapped around the toothed pulleys attached to a crankshaft and a camshaft. In particular, if the toothed pulleys include a toothed pulley having a minimum pitch diameter of 30 mm or less, the toothed belt B according to the embodiment more effectively reduces a decrease in the strength of the belt used in the environment where oil adheres to the belt.

A production method for the toothed belt B according to the embodiment will be described with reference to FIG. 3 and FIGS. 4A to 4C.

A production method for the toothed belt B according to the embodiment includes a material preparation step, a shaping step, a crosslinking step, and a finishing step.

First, in the material preparation step, a rubber component is masticated. Various compound ingredients are put into the masticated rubber component and kneaded to obtain an uncrosslinked rubber composition. Then, the obtained uncrosslinked rubber composition is pressed into a sheet by calendering or any other suitable process to prepare an uncrosslinked rubber sheet for a toothed belt body 11. Further, binder treatment and twisting are performed to integrate a filament bundle of high-strength glass fibers 121a together through a binder 121b, thereby preparing a cord 12. Furthermore, a fabric 131 is subjected to adhesion treatment including coating treatment for forming a surface-coating rubber layer 132, thereby preparing a reinforcing fabric 13.

Figure 3:
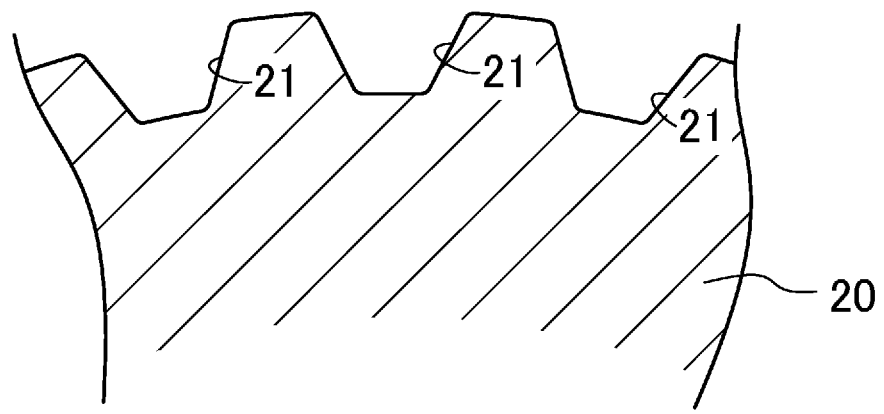
FIG. 3 is a cross-sectional view illustrating a portion of a belt forming mold in an enlarged scale.

FIG. 3 illustrates a belt forming mold 20 used to form the toothed belt B. The belt forming mold 20 is cylindrical and provided, on its outer circumferential surface, with belt tooth-forming grooves 21 extending in an axial direction of the mold 20 and arranged at regular pitches in a circumferential direction of the mold 20.

Figure 4A:
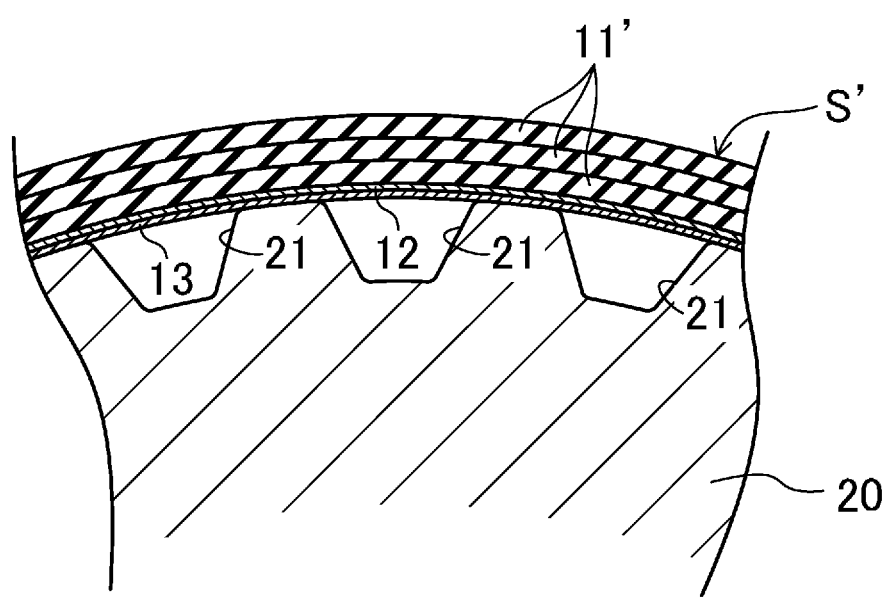
FIG. 4A is a first drawing for explaining a method for forming the toothed belt according to the embodiment.

In the shaping step, as illustrated in FIG. 4A, the cylindrical reinforcing fabric 13 is placed on the outer periphery of the belt forming mold 20. The cord 12 is helically wound around the reinforcing fabric 13. Uncrosslinked rubber sheets 11' are then wrapped over the wound cord 12. At this moment, an uncrosslinked slab S' is formed on the belt forming mold 20.

Figure 4B:
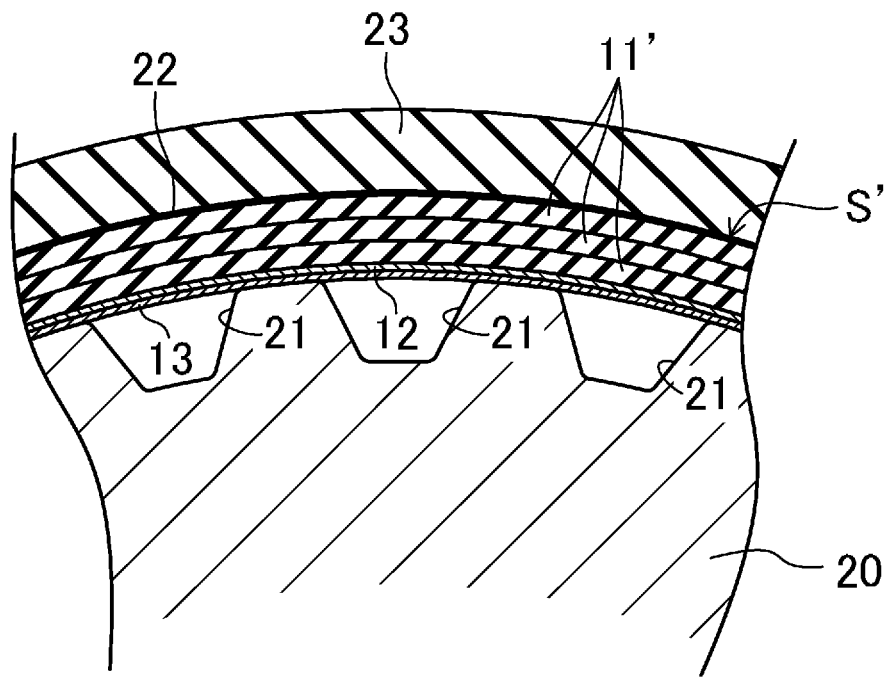
FIG. 4B is a second drawing for explaining the method for forming the toothed belt according to the embodiment.
Figure 4C:
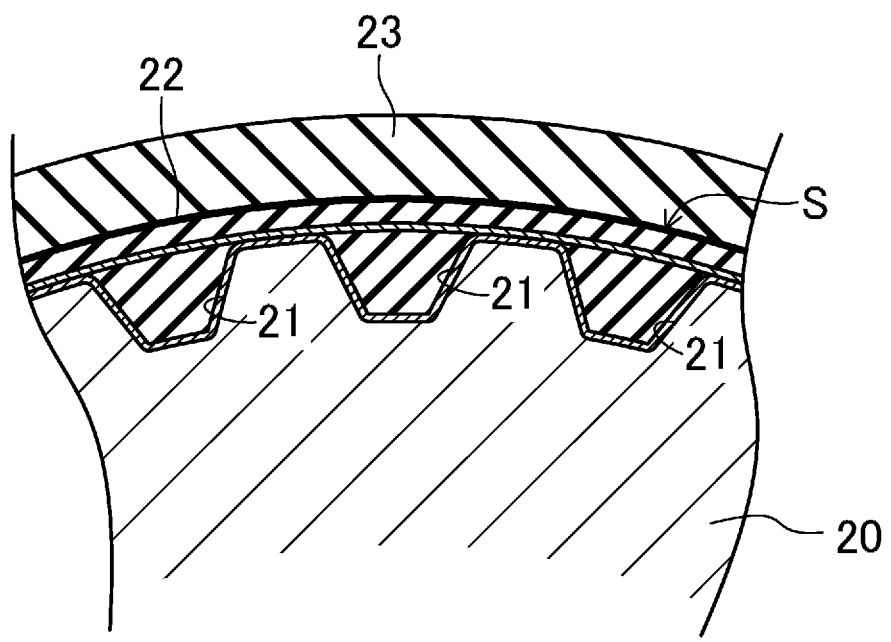
FIG. 4C is a third drawing for explaining the method for forming the toothed belt according to the embodiment.

In the crosslinking step, as illustrated in FIG. 4B, a mold release paper 22 is wound around the outer periphery of the uncrosslinked slab S'. After that, a rubber sleeve 23 is placed on the mold release paper 22. The uncrosslinked slab S' with the rubber sleeve 23 is placed in a vulcanizer, and the vulcanizer is sealed. The vulcanizer is filled with high-temperature and high-pressure steam. This state is maintained for a predetermined time. At this moment, due to the heating and pressurization during belt formation, the uncrosslinked rubber sheets 11' flow into the belt tooth-forming grooves 21 of the belt forming mold 20 while pressing the reinforcing fabric 13, and the rubber component is crosslinked. Moreover, the cord 12 and the reinforcing fabric 13 are combined and integrated with the uncrosslinked rubber sheets 11'. A rubber cement coating layer of an uncrosslinked rubber composition that makes a surface of the reinforcing fabric 13 toward the belt forming mold 20 is heated and pressed during the belt formation, thereby crosslinking the rubber component. As a result, a cylindrical belt slab S is obtained as illustrated in FIG. 4C. The vulcanizer has an internal temperature ranging from 100° C. to 200° C., for example, and has an internal pressure of, for example, 1.5 MPa or less. The period of treatment ranges from 5 minutes to 30 minutes, for example.

In the finishing step, the pressure of the inner space of the vulcanizer is reduced to unseal the vulcanizer. The belt slab S formed between the belt forming mold 20 and the rubber sleeve 23 is removed. The backface of the belt slab S is ground to adjust the thickness. After that, the belt slab S is cut into rings having a predetermined width, thereby obtaining the toothed belt B.

The foregoing embodiment illustrates the belt having an outer periphery from which the belt body 11 made of the rubber composition is exposed, as a non-limiting example. The outer periphery of the belt body may be coated with another reinforcing fabric.

EXAMPLES (Toothed Belt)
The following toothed belts of Examples 1 and 2 and Comparative Examples 1 to 4 were produced. The configuration of each toothed belt will also be shown in Table 1.

Example 1

A binder treatment solution containing H-NBR latex as a base and obtained by dispersing, in the H-NBR latex, 4,4'-phenylmethane bismaleimide as a maleimide-based compound, a polyisocyanate compound, and carbon black and silica as a powdery inorganic filler was prepared. The resultant solution was stored in a cistern. Here, the content of 4,4'-phenylmethane bismaleimide as the maleimide-based compound was 10 parts by mass with respect to 100 parts by mass of the rubber component in the H-NBR latex. The content of the polyisocyanate compound was also 10 parts by mass with respect to 100 parts by mass of the rubber component in the H-NBR latex.

A filament bundle of high-strength glass fibers (having an S glass $SiO_2$ content fraction of 64% by mass and a filament diameter of 9 μm) was continuously passed through the binder treatment solution stored in the cistern, and was taken out of the binder treatment solution. The filament bundle was then passed through a heating furnace to form a band-like material in which the filament bundle of the high-strength glass fibers were integrated together through a binder that was a solidified binder treatment solution. The band-like material was first-twisted in one direction to form a strand, which was wound around each of bobbins. To form the filament bundle of the high-strength glass fibers, three yarns each including 200 high-strength glass fibers were collected together. The heating temperature of the heating furnace (i.e., preset internal furnace temperature) was 150° C., and the period of heating (i.e., dwell time in the furnace) was 120 seconds. The number of first twists of the strand per 10 cm was four.

Three strands respectively pulled out from three of the bobbins were paralleled and second-twisted in a direction opposite to the direction in which the strands are first-twisted to form a cord made of a plied yarn (a 3/3 configuration), which was wound around a bobbin. The number of second twists of the cord per 10 cm was 32. The amount of the binder adhering to the cord was 23% by mass with respect to the mass of the high-strength glass fibers. As the cord, two types of twist yarns (i.e., S-twist yarns and Z-twist yarns) were prepared. The cord was further immersed in rubber cement of chloric rubber and dried, thereby coating the cord surface with a cement rubber layer.

A rubber alloy containing H-NBR as a rubber component and zinc methacrylate dispersed therein ("Zeoforte ZSC2195H" made by Zeon Corporation, bound acrylonitrile content in H-NBR as a base: 36% by mass, iodine value of H-NBR as a base: 11 mg/100 mg, Mooney viscosity of H-NBR as a base: 80 MS) was placed into a chamber of an internal Banbury mixer and masticated therein. Next, with respect to 100 parts by mass of the rubber component, the following substances were mixed: 5 parts by mass of zinc oxide serving as a vulcanization accelerator aid, 2.5 parts by mass of an antioxidant, 1 part by mass of carbon black serving as a reinforcing material, 20 parts by mass of silica serving as a reinforcing material, 5 parts by mass of a plasticizer, 5 parts by mass of N,N'-m-phenylenebismaleimide ("VULNOC PM" made by Ouchi Shinko Chemical Industrial Co., Ltd.) serving as a co-crosslinking agent, 90 parts by mass of PTFE resin powder ("Fluon L173JE" made by AGC Inc., average particle size: 7 μm), and 5 parts by mass of an organic peroxide ("PERBUTYL P" made by NOF CORPORATION, α, α'-di(tri-tert-butylperoxy)diisopropylbenzene. The resultant mixture was kneaded with the mixer to produce an uncrosslinked rubber composition. The resultant uncrosslinked rubber composition was dissolved in methyl ethyl ketone, thereby preparing first rubber cement for forming a surface-coating rubber layer.

A blended rubber as a rubber component that contains: 80% by mass of a rubber alloy ("Zeoforte ZSC2195H") containing H—NBR and zinc methacrylate dispersed therein; and 20% by mass of H-NBR that is not an alloy ("Zetpol 2000" made by Zeon Corporation, bound acrylonitrile content: 36% by mass, iodine value: 7 mg/100 mg, Mooney viscosity: 85 $ML_{1+4}$ (100° C.)) was placed into a chamber of an internal Banbury mixer and masticated therein. Next, with respect to 100 parts by mass of the rubber component, the following substances were mixed: 10 parts by mass of zinc oxide serving as a vulcanization accelerator aid, 2.5 parts by mass of an antioxidant, 20 part by mass of carbon black serving as a reinforcing material, 10 parts by mass of silica serving as a reinforcing material, 8 parts by mass of a plasticizer, 5 parts by mass of N,N'-m-phenylenebismaleimide ("VULNOC PM" made by Ouchi Shinko Chemical Industrial Co., Ltd.) serving as a co-crosslinking agent, 3 parts by mass of trimethylolpropane trimethacrylate ("Hi-Cross M" made by Seiko Chemical Co., Ltd.) serving as a co-crosslinking agent, 0.5 parts by mass of sulfur serving as a crosslinking agent, and 2 parts by mass of an organic peroxide ("PERBUTYL P" made by NOF CORPORATION). The resultant mixture was kneaded with the mixer to produce an uncrosslinked rubber composition. The resultant uncrosslinked rubber composition was dissolved in methyl ethyl ketone, thereby preparing second rubber cement for forming a reinforcing fabric adhesion coat.

A woven fabric of nylon 6,6 fibers (Leona 6,6) (warp yarns: single twist yarns with a fineness of 44 dtex, weft yarns: plied yarns with a fineness of 44 dtex/2) was subjected to RFL treatment in which the woven fabric was immersed in an RFL solution and heated. After that, a surface of the woven fabric opposite to the toothed belt body 11 was subjected to coating treatment in which the surface was coated with the first rubber cement and dried, thereby forming a reinforcing fabric. Further, a surface of the reinforcing fabric toward the toothed belt body 11 was subjected to coating treatment in which the surface was coated with the second rubber cement and dried.

A toothed belt having a configuration similar to that of the toothed belt of the foregoing embodiment and having teeth with a pitch of 4.5 mm was produced as Example 1, using the thus prepared cord and reinforcing fabric.

The toothed belt body was made of a rubber composition containing H-NBR ("Zetpol 2001" made by Zeon Corporation, bound acrylonitrile content: 40% by mass, iodine value: 8 mg/100 mg, Mooney viscosity: 95 $ML_{1+4}$ (100° C.)) as a rubber component.

Example 2

A toothed belt having the same configuration as that of Example 1, except that the number of second twists of the cord per 10 cm was 24, was produced as Example 2.

Comparative Example 1

A toothed belt having the same configuration as that of Example 1, except that the coating treatment using the first rubber cement was not performed and no surface-coating rubber layer was thus provided, was produced as Comparative Example 1.

Comparative Example 2

A toothed belt having the same configuration as that of Example 2, except that the coating treatment using the first rubber cement was not performed and no surface-coating rubber layer was thus provided, was produced as Comparative Example 2.

Comparative Example 3

A toothed belt having the same configuration as that of Example 1, except that standard glass fibers (having an E glass $SiO_2$ content fraction of 53% by mass and a filament diameter of 9 μm) were used as the cord instead of the high-strength glass fibers, was produced as Comparative Example 3.

Comparative Example 4

A toothed belt having the same configuration as that of Comparative Example 3, except that instead of the binder treatment solution, an RFL solution was used to treat the cord, was produced as Comparative Example 4.

TABLE 1

|   |   | Examples | | Comparative Examples | | | |
|---|---|---|---|---|---|---|---|
|   |   | 1 | 2 | 1 | 2 | 3 | 4 |
| Cord | Type of Glass Fibers | High Strength | High Strength | High Strength | High Strength | Standard | Standard |
|   | Number of First Twists (Times/10 cm) | 32 | 24 | 32 | 24 | 32 | 32 |
|   | Surface-Coating Rubber Layer? | Yes | Yes | No | No | Yes | Yes |
| Belt Strength | Undriven (Relative Value) | 100 | 150 | 100 | 150 | 79 | 81 |
|   | After 0.1A Hours (Relative Value) | 92 | 108 | 81 | 99 | 73 | 63 |
|   | After 0.3A Hours (Relative Value) | 86 | 90 | 74 | 80 | 68 | 56 |
|   | After 0.5A Hours (Relative Value) | 81 | 83 | 65 | 66 | 64 | 52 |
|   | After A Hours (Relative Value) | 79 | 78 | 52 | 46 | 63 | 39 |

(Test Method)

Figure 5:
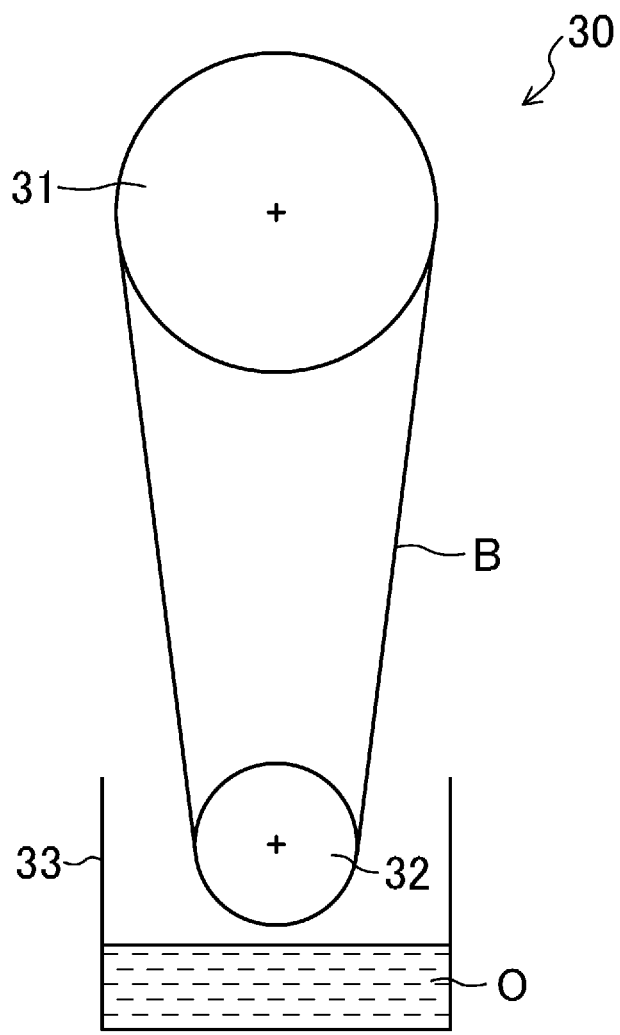
FIG. 5 illustrates a layout of pulleys of a belt running tester.

FIG. 5 shows a belt running tester 30.

The belt running tester 30 includes a larger pulley 31 and a smaller pulley 32. The larger pulley 31 is a toothed pulley having 30 teeth and a pitch diameter of 42.97 mm. The smaller pulley 32 is a toothed pulley provided below the larger pulley 31 and having 15 teeth and a pitch diameter of 21.49 mm. The smaller pulley 32 is disposed in an oil pan 33.

The toothed belt B of each of Examples 1 to 2 and Comparative Examples 1 to 4 was wound around the larger pulley 31 and the smaller pulley 32. Oil O was stored in the oil pan 33 to the extent that the oil O is prevented from being in contact with the toothed belt B. The oil O had its temperature adjusted to 140° C., and was stirred so that the periphery of the smaller pulley 32 was placed in an oil atmosphere. In this state, the larger pulley 31 was rotated at a rotational speed of 6000 rpm to drive the toothed belt B only for a fixed period as a belt running test.

The belt strength of the toothed belt B not driven was measured, and the measured belt strength was divided by the number of cords per belt width to calculate the belt strength per cord. Likewise, the belt strength, per cord, of the toothed belt B which underwent the belt running test for a predetermined period was also calculated. The time of a belt running test was divided into four levels, i.e., A hours as the longest one, 0.1 A hours, 0.3 A hours, and 0.5 A hours. The belt strength, per cord, of the belt of Example 1 not driven was assumed to be 100. In that case, the belt strength of the driven belt of Example 1 per cord, the belt strength, per cord, of the belt of each of Example 2 and Comparative Examples 1 to 4 not driven, and the belt strength, per cord, of the driven belt of each of Example 2 and Comparative Examples 1 to 4 were calculated as values relative to the belt strength, per cord, of the belt of Example 1 not driven. Changes over time in the belt strengths thus calculated were checked.

(Test Results)

Table 1 shows the test results. FIG. 6 shows changes in a relationship between belt running time and belt strength per cord.

Based on these results, a comparison between Example 1 and Comparative Example 1 shows that the belt of Example 1 including a surface-coating rubber layer is less likely to decrease in the strength, as compared with the belt of Comparative Example 1 not including the surface-coating rubber layer, when the belts are used in the environment where oil adheres to the belt. The same statement applies to a comparison between Example 2 and Comparative Example 2. The belts of Example 2 and Comparative Example 2 have initial belt strengths that are 1.5 times as high as the belt strengths of the belts of Example 1 and Comparative Example 1, respectively. However, after driven for A hours, the belts of Example 2 and Comparative Example 2 are found to have belt strengths that are substantially equivalent to the belt strengths of the belts of Example 1 and Comparative Example 1, respectively.

A comparison between Example 1 and each of Comparative Examples 3 and 4 shows that the belt of Example 1 including high-strength glass fibers keeps a higher absolute belt strength before and after the driving of the belt, compared with the belt of each of Comparative Examples 3 and 4 including standard glass fibers.

A comparison between Comparative Examples 3 and 4 shows that the belt of Comparative Example 3 including a cord treated with the same binder treatment solution as that of Example 1 reduces a decrease in the strength of the belt used in the environment where oil adheres to the belt, as compared with the belt of Comparative Example 4 including a cord treated with an RFL solution.

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A toothed belt comprising:
a toothed belt body made of rubber and having an endless rubber strip portion and a plurality of toothed rubber portions integrated with one surface of the rubber strip portion so as to be spaced apart from each other in a belt length direction;

a cord embedded in the rubber strip portion of the toothed belt body so as to extend while forming a helical pattern having a pitch in a belt width direction; and a reinforcing fabric covering a surface of the toothed belt body where the toothed rubber portions are formed, wherein the cord is made of a twisted yarn including a band-like material, the band-like material including a filament bundle of high-strength glass fibers integrated together through a binder, the binder containing a rubber component, at least either a maleimide-based compound or a polyisocyanate compound, and a powdery inorganic filler, a surface of the reinforcing fabric facing opposite to the toothed belt body is coated, through a coating treatment if rubber cement, with a surface-coating rubber layer made of a rubber composition containing a rubber component including hydrogenated nitrile-butadiene rubber as a main part.

2. The toothed belt of claim 1, wherein
the rubber component of the binder includes hydrogenated nitrile-butadiene rubber.

3. The toothed belt of claim 1, wherein
a content of the maleimide-based compound and/or the polyisocyanate compound in the binder with respect to 100 parts by mass of the rubber component ranges from 1 part by mass to 40 parts by mass.

4. The toothed belt of claim 1, wherein
the binder contains both of the maleimide-based compound and the polyisocyanate compound.

5. The toothed belt of claim 1, wherein
a content of the powdery inorganic filler in the binder with respect to 100 parts by mass of the rubber component ranges from 0.5 parts by mass to 20 parts by mass.

6. The toothed belt of claim 1, wherein
the powdery inorganic filler of the binder contains at least either carbon black or silica.

7. The toothed belt of claim 1, wherein
the binder does not substantially contain a phenolic resin.

8. The toothed belt of claim 1, wherein
an amount of the binder adhering to the cord ranges from 5% by mass to 40% by mass with respect to a mass of the high-strength glass fibers.

9. The toothed belt of claim 1, wherein
the twisted yarn constituting the cord is a plied yarn including a plurality of strands each configured as the band-like material first-twisted in one direction, the strands being collected, paralleled, and second-twisted in a direction opposite to the direction in which the strands are first-twisted, and the number of times the cord is second-twisted ranges from 16 to 40 times per 10 cm of the cord.

10. The toothed belt of claim 9, wherein
the number of times at which each strand is first-twisted per 10 cm of the strand is less than the number of times at which the cord is second-twisted per 10 cm of the cord.

11. The toothed belt of claim 1, wherein
the rubber composition that makes the surface-coating rubber layer contains fluoric resin powder.

12. The toothed belt of claim 1, wherein
the rubber composition that makes the surface-coating rubber layer contains carbon black and silica.

13. The toothed belt of claim 12, wherein
a content of the silica in the rubber composition that makes the surface-coating rubber layer is higher than that of the carbon black.

14. The toothed belt of claim 1, wherein
the rubber component of the rubber composition that makes the surface-coating rubber layer contains a rubber alloy including hydrogenated nitrile-butadiene rubber with unsaturated carboxylic metal salt dispersed in the hydrogenated nitrile-butadiene rubber.

15. The toothed belt of claim 1, wherein
a reinforcing fabric adhesion coat made of a rubber composition containing a rubber component that contains hydrogenated nitrile-butadiene rubber as a main part is provided between the toothed belt body and the reinforcing fabric.

16. The toothed belt of claim 15, wherein
the rubber component of the surface-coating rubber layer contains a rubber alloy alone, the rubber alloy including hydrogenated nitrile-butadiene rubber with unsaturated carboxylic metal salt dispersed in the hydrogenated nitrile-butadiene rubber, and the rubber component of the reinforcing fabric adhesion coat contains a blended rubber of a rubber alloy including hydrogenated nitrile-butadiene rubber with unsaturated carboxylic metal salt dispersed in the hydrogenated nitrile-butadiene rubber and hydrogenated nitrile-butadiene rubber that is not an alloy.

17. The toothed belt of claim 16, wherein
a content of the rubber alloy in the rubber component of the reinforcing fabric adhesion coat is higher than that of the hydrogenated nitrile-butadiene rubber that is not an alloy.

18. The toothed belt of claim 15, wherein
the rubber composition that makes the reinforcing fabric adhesion coat and the rubber composition that makes the surface-coating rubber layer both contain carbon black, and a content of the carbon black in the rubber composition that makes the reinforcing fabric adhesion coat with respect to 100 parts by mass of the rubber component is higher than that of the carbon black in the rubber composition that makes the surface coating rubber layer with respect to 100 parts by mass of the rubber component.

19. The toothed belt of claim 15, wherein
the rubber composition that makes the reinforcing fabric adhesion coat and the rubber composition that makes the surface-coating rubber layer both contain silica, and a content of the silica in the rubber composition that makes the reinforcing fabric adhesion coat with respect to 100 parts by mass of the rubber component is lower than that of the silica in the rubber composition that makes the surface coating rubber layer with respect to 100 parts by mass of the rubber component.

20. The toothed belt of claim 15, wherein
the rubber composition that makes the reinforcing fabric adhesion coat and the rubber composition that makes the surface-coating rubber layer both contain carbon black and silica, and a content of the silica in the rubber composition that makes the reinforcing fabric adhesion coat is lower than that of the carbon black, while a content of the silica in the rubber composition that makes the surface-coating rubber layer is higher than that of the carbon black.

* * * * *